Dec. 16, 1941.  G. B. WARREN  2,266,577
ELASTIC FLUID TURBINE
Filed July 1, 1938
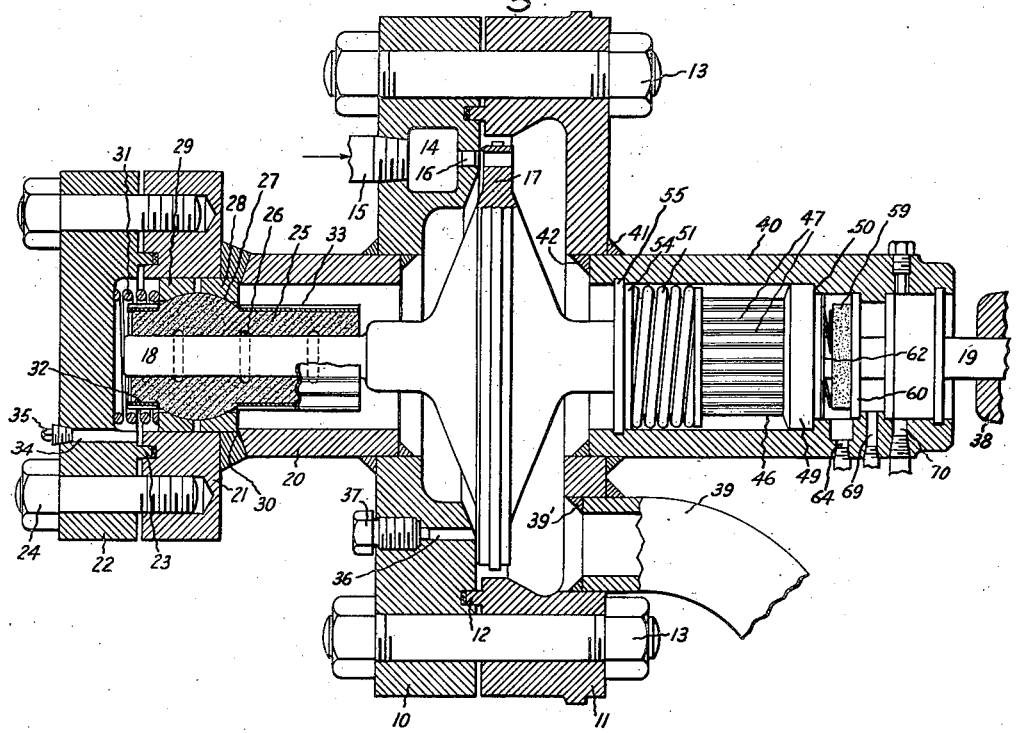
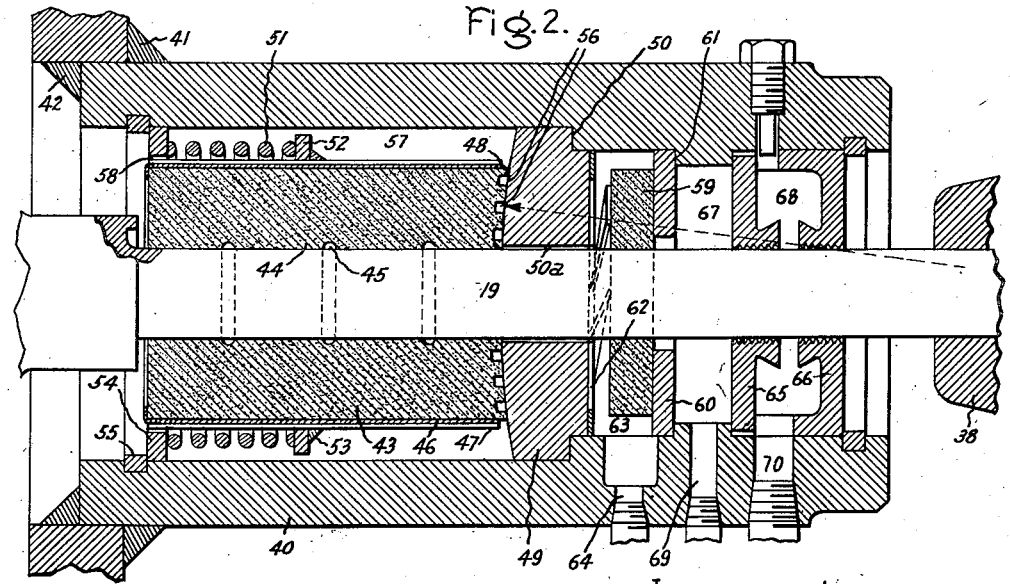
Inventor:
Glenn B. Warren,
by Harry E. Dunham
His Attorney.

Patented Dec. 16, 1941

2,266,577

UNITED STATES PATENT OFFICE 2,266,577

ELASTIC FLUID TURBINE

Glenn B. Warren, Niskayuna, N. Y., assignor to General Electric Company, a corporation of New York Application July 1, 1938, Serial No. 216,939

2 Claims. (Cl. 253—39)

The present invention relates to elastic fluid turbines, particularly to turbines using elastic fluid under high pressure and temperature. In high pressure, high temperature turbine arrangement special attention must be paid to bearings for supporting the turbine shaft and packings for reducing leakage of elastic fluid along the shaft past the turbine casing.

The general object of my invention is to provide an improved construction and arrangement of elastic fluid turbines, and specific objects of my invention are the provision of improved bearing and packing means for such turbines whereby leakage on the high pressure side is eliminated and on the low pressure side substantially reduced.

For a consideration of what I believe to be novel and my invention, attention is directed to the following description and the claims appended thereto in connection with the accompanying drawing.

In the drawing, Fig. 1 illustrates a sectional view of an elastic fluid turbine embodying my invention, and Fig. 2 shows an enlarged detail view of a part of Fig. 1.

The arrangement comprises a turbine casing having two halves 10 and 11 jointed by a groove and tongue flange 12 and rigidly secured together by bolts and nuts 13. The casing half 10 forms a chest 14 to which elastic fluid is supplied by a conduit 15. Elastic fluid is conducted from the chest 14 through a nozzle opening or openings 16 to a bucket wheel 17. To avoid steam thrust and deflection of the bucket wheel and the shaft, it is desirable to admit steam or like fluid to spaced portions of the bucket wheel for partial admission operation of the turbine. The bucket wheel 17 in the present instance is integrally formed with a shaft having a left-hand portion or extension 18 and a right-hand portion or extension 19, the shaft extension 18 being on the high pressure side and the shaft extension 19 on the low pressure side of the turbine wheel 17. In accordance with my invention the shaft 18 is supported by a bearing completely enclosed in the casing. By "completely enclosed" I mean hermetically enclosed or sealed so that no leakage of fluid can take place along the shaft 18 to the atmosphere. To this end the casing half 10 is provided with an extension 20 having a flange 21 closed by an end plate 22 which forms a tongue and groove joint 23 with the flange 21 and is securely fastened to the latter by a plurality of bolts 24. The casing extension 20 supports a self-lubricating bearing made from a material resistant to high pressure, high temperature elastic fluid. In the present instance I have shown a bearing 25 supporting the shaft extension 18. The bearing is made from a solid block of carbon or like material with self-lubricating quality and high resistance against high temperature elastic fluid such as steam and with a bore or bearing surface for the shaft 18. The bearing surface has a plurality of axially spaced annular grooves 26 in which dirt or other foreign substance may collect. An intermediate portion of the bearing block has an outer, spherical surface 27 seated on a spherical support. This support comprises two halves 28 and 29. The supporting half 28 engages a shoulder 30 formed on the casing extension 20 and the supporting half 29 is biased towards the spherical surface 27 by a compression spring 31 between the supporting half 29 and the end plate 22. The bearing portions to the left and to the right of the support are cylindrical and enclosed in casings or jackets 32 and 33 made preferably from thin, flexible sheet steel corrugated in axial direction to take care of the relative expansion between the carbon material of the bearing and the steel of the jacket. The spherical portion of the bearing and the spherical support permit the bearing to align itself properly with the shaft. Condensate formed after shut-down of the turbine on the high pressure side thereof may be drained through a channel 34 normally closed by a plug 35 in the end plate 22. With the bearing completely enclosed in the turbine, no provision need be made to prevent leakage on the high pressure side of the turbine.

Data on the load-supporting properties of journal bearings indicate that the load-carrying ability of a bearing is definitely related to the speed of rotation and the viscosity of the lubricating medium between the shaft and the stationary part of the bearing. In the present arrangement the lubricating medium aside from the self-lubricating qualities of the carbon bearing is high pressure, high temperature elastic fluid such as steam in case the turbine is operated as a steam turbine. The use of superheated steam as a bearing fluid has the important advantage that its viscosity increases with increasing temperature in contrast to the property of oil whose viscosity decreases rapidly with increasing temperature. Due to the increase of viscosity of steam with increasing temperature there is less tendency of a steam-lubricated bearing to fail due to overload than in the case of an oil-lubricated bearing when operated at a corresponding load with respect to its maximum capacity.

The casing half 10 has a bore 36 closed by a plug 37 to permit checking of the clearance between the inlet side of the turbine wheel and the adjacent casing wall after assembly. The right-hand portion of the shaft, that is, the shaft extension 19 is supported in the usual manner by an oil lubricated bearing 38 outside the turbine casing. Elastic fluid discharge from the turbine wheel 17 is conducted through a conduit 39 connected by a weld 39' to an opening in the casing half 11.

In order to prevent leakage of steam along the shaft extension 19 past the turbine casing, special sealing means are provided. These sealing means are enclosed in a cylindrical extension 40 secured to the low pressure casing half 11 by welds 41 and 42. The packing arrangement includes a long, solid, that is, unsplit sleeve 43 made from carbon and having a cylindrical bore 44 with a plurality of axially spaced grooves 45 in sealing contact with the shaft extension 19. The grooves 45, as in the case of the bearing, serve to collect dirt. The length of the sleeve is of the order of the outer sleeve diameter. The sleeve is enclosed by a metallic casing such as a steel cylinder 46. In the present instance the steel cylinder has longitudinal corrugations 47 to permit relative expansion between the carbon and the steel. The carbon packing forms two sealing surfaces. One of the surfaces is defined by the cylindrical bore engaging the shaft extension 19 and the other sealing surface is defined by the right-hand end face 48 which is spherically-shaped and engages a spherical surface formed by a ring 49. This ring is seated on a shoulder 50 of the casing extension 40 and forms a clearance 50a with the shaft. The center of the spherical surfaces of the right-hand end face of the carbon sleeve 43 and of the ring 49 is near the bearing 38, preferably beyond the same when viewed from the turbine end. This arrangement permits the shaft to center the carbon packing in any position it may be and at the same time assume a uniform sealing contact between the shaft and the cylindrical bore of the carbon packing as well as between the spherical end face of the carbon packing and the spherical face of the ring 49. The carbon packing is biased towards the ring 49 by a compression spring 51 which at its right-hand end bears against a ring 52 secured to the steel casing 46 of the carbon packing by a weld 53. The left-hand end of the spring 51 bears against a ring 54, which latter engages a split ring 55 held in a groove of the casing extension 40. The turbine rotor structure, in particular the shafts 18, 19, is comparatively light so that during operation the center line of the shaft may curve, in which case the engaging surfaces of the ring 50 and the carbon packing move relative to each other. As both surfaces are of the same spherical shape and have a common center near the bearing, a constant sealing contact between these surfaces will be maintained in any position of the carbon packing. The spherical end face of the carbon packing has a plurality of concentrical grooves 56 to balance the pressure differential existing across the carbon sleeve. During operation the sealing contact between the carbon sleeve and the shaft reduces leakage along the shaft and the sealing contact between the carbon sleeve, and the ring 50 reduces leakage along the spherical surface of the ring 50 in radially inward direction, that is, from the annular space 57 formed between the casing extension 40 and the outer surface of the carbon packing. This space 57 communicates with the exhaust end of the turbine through a clearance 58 formed between the ring 54 and the packing casing 46.

The arrangement includes an auxiliary carbon packing in the form of an ordinary carbon ring 59 floating on the shaft and having sealing contact with a ring 60 engaging a shoulder 61 on the casing. The packing ring 59 is biased towards the ring 60 by leaf spring means 62 between the ring 49 and the packing ring 59. The auxiliary packing ring 59 is contained in a chamber 63. Any fluid leaking into this chamber is discharged therefrom through a drain hole 64. To the right of the auxiliary carbon packing I have shown two labyrinth type packings 65 and 66 supported on the casing and forming grooved, cylindrical surfaces in sealing contact with the shaft 19. These packings together with the carbon packing 59 form chambers 67 and 68 from which leakage may be drained through openings 69 and 70 respectively.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. An axial flow elastic fluid turbine comprising a casing having a high pressure end with an axial outward extension, an end plate hermetically sealing the extension to the atmosphere to eliminate leakage of fluid from the high pressure end of the casing, a rotor in the casing with a shaft projecting into the extension, and a self-lubricating journal bearing for operation at high temperatures completely enclosed within the extension to support the shaft, said end plate permitting dismantling of the bearing without dismantling the casing.

2. An elastic fluid turbine comprising a fabricated casing having a high pressure half with an axial opening, a cylindrical flanged extension fused to the opening, means hermetically sealing the cylindrical extension to the atmosphere to eliminate leakage of fluid from the high pressure end of the casing, a rotor enclosed in the casing and having a shaft projecting into the extension, and a self-aligning and self-lubricating journal bearing located within the extension for supporting the shaft.

GLENN B. WARREN.